United States Patent

Shaver

[11] Patent Number: 4,583,353
[45] Date of Patent: Apr. 22, 1986

[54] UNDERWATER WEED CUTTER

[76] Inventor: Richard L. Shaver, 5101 Fairview Ave. North, Crystal, Minn. 55429

[21] Appl. No.: 650,779

[22] Filed: Sep. 14, 1984

Related U.S. Application Data

[63] Continuation-in-part of Ser. No. 555,145, Nov. 25, 1983, abandoned.

[51] Int. Cl.$^4$ .............................................. A01D 44/00
[52] U.S. Cl. ............................................................. 56/8
[58] Field of Search ............................ 56/8, 9, 101, 228

[56] References Cited

U.S. PATENT DOCUMENTS 892,628  7/1908  Stapple .................................. 56/101

FOREIGN PATENT DOCUMENTS 512283  11/1930  Fed. Rep. of Germany ............ 56/8
496260  11/1938  United Kingdom ...................... 56/8
776788   6/1957  United Kingdom ...................... 56/8

*Primary Examiner*—Jay N. Eskovitz
*Attorney, Agent, or Firm*—Clayton R. Johnson

[57] ABSTRACT

Underwater weed cutter that includes a front base plate or mounting member that pivotally mounts a pair of blade mounts for movement between a weed cutting position extending diverging rearwardly and a generally parallel storage position, the blade mounts mounting the blades to be on remote side edges of the mounts when the mounts are in a weed cutting position and adjacent one another when the mounts are in a storage position, an elongated back brace that is connected at its opposite ends to portions of the blade mounts remote from the mounting member when the cutter is in a weed cutting position, a pair of parallel runners having one ends connected to the brace in transverse spaced relationship and opposite ends pivotally connected to the respective mount when the cutter is in a weed cutting position, a combination weed deflector and runner, a handle mount assembly pivotally mounted on the front member for movement between a weed cutting position and a storage position, and a handle mounted by said assembly for pulling the weed cutter.

Advantageously the brace and runners are constructed to be selectively connected for cutting a wide or a narrow swath. Also the rear brace can be shaped to serve as fin providing a downward force acting to hold the cutter down as it is pulled to cut weeds.

31 Claims, 19 Drawing Figures

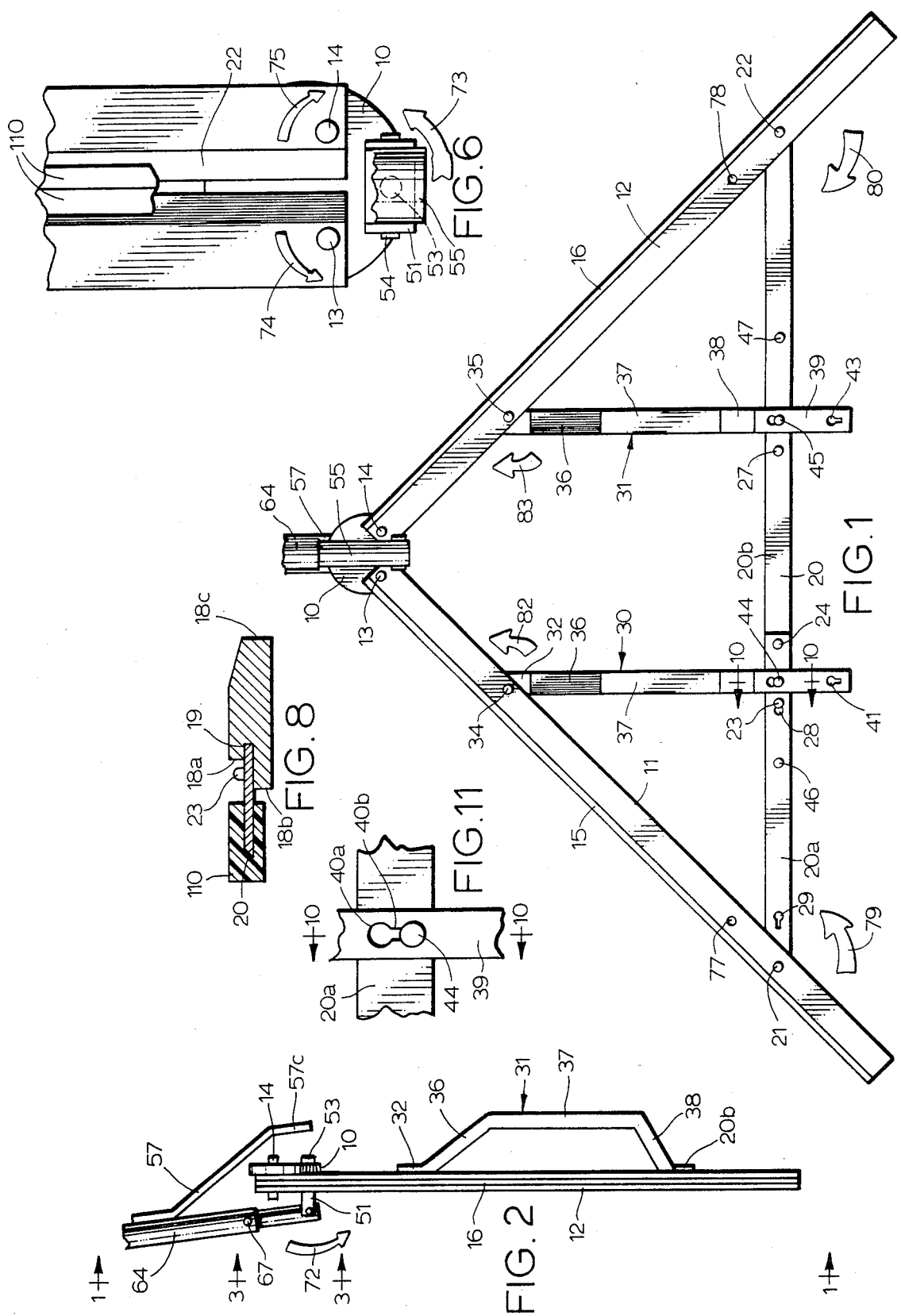

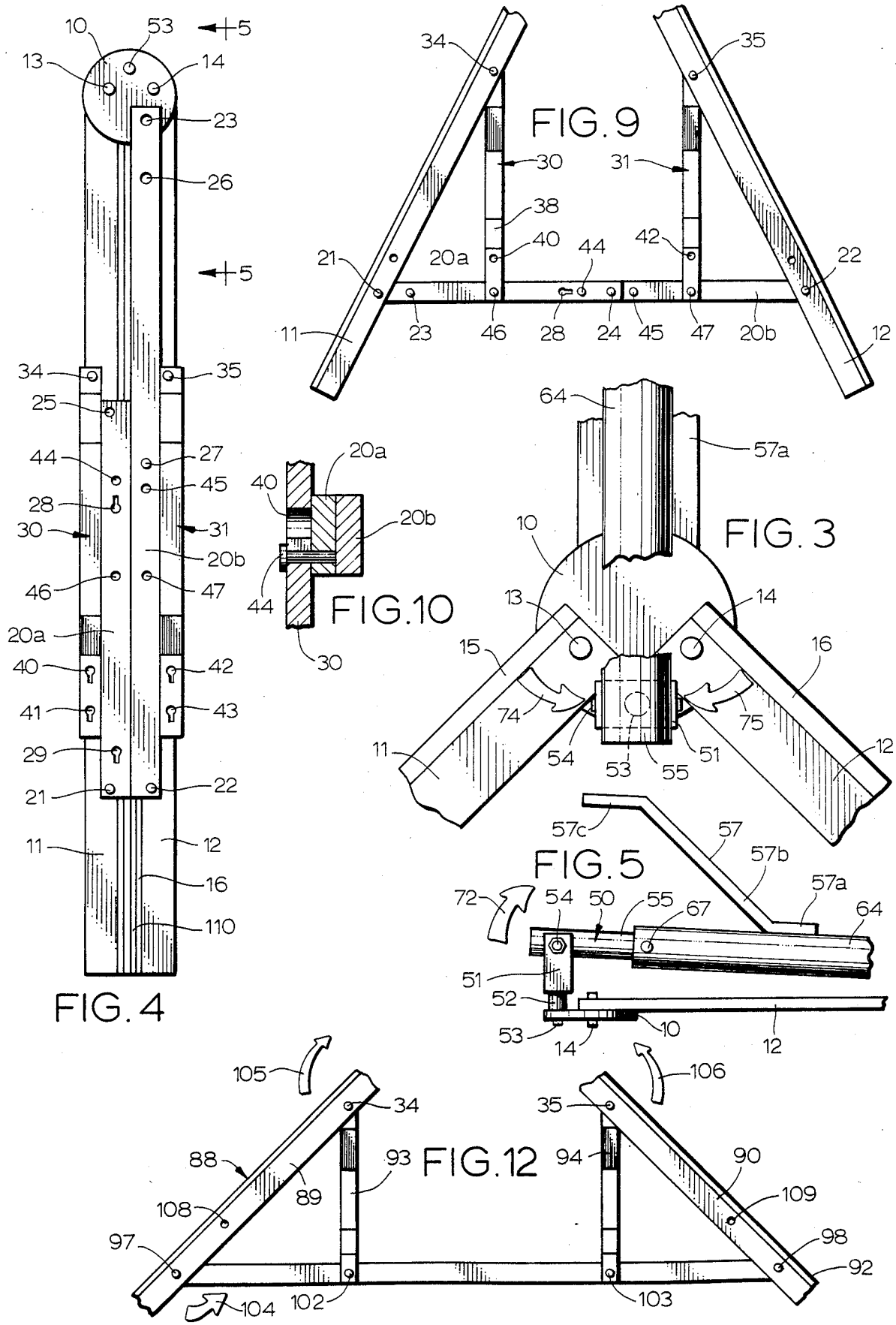

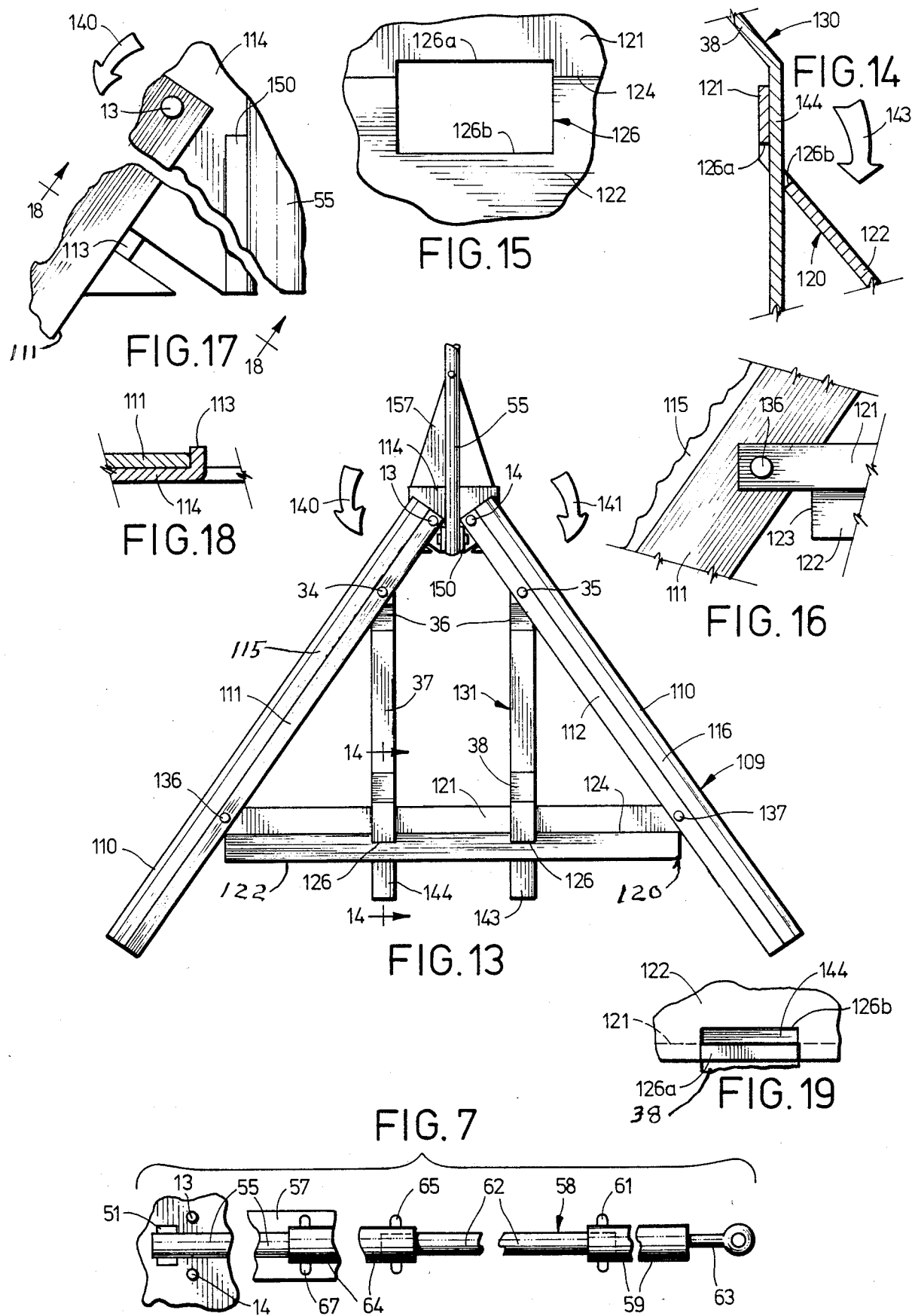

UNDERWATER WEED CUTTER

CROSS REFERENCE TO RELATED APPLICATIONS

This application is a continuation-in-part application of my application Ser. No. 555,145, filed Nov. 25, 1983, and now abandoned.

BACKGROUND OF THE INVENTION

An underwater weed cutter for cutting marine plant growth close to the bottom of a body of water.

In U.S. Pat. No. 3,601,956 there is disclosed an underwater weed cutter having a central body to which the one ends of blades are connected for limited pivotal movement and a boss is welded to the body to have a handle attached thereto. Each of U.S. Pat. Nos. 2,702,975 and 2,949,003 disclose an underwater weed cutter having a guide member that mounts the front ends of a pair of blades that diverge in a rearward direction with the guide member rear portion bisecting the angle of divergence. U.S. Pat. No. 2,949,003 further discloses providing a horizontal and a vertical fin extending rearwardly of the guide element.

Each of British Pat. Nos. 496,260 and 776,788 disclose an underwater weed cutter; '788 disclosing a pair of cutter units that are mounted by spaced pivot members on a bracket for pivotal movement about axes parallel to the direction of pulling of the cutter, where as '260 discloses a mounting plate having the one end portion of each of a pair of cutter units attached thereto by a pair of bolts and a bracket secured thereto. Both of the British patents disclose the bracket being retained in selected pivotally adjusted positions relative a pulling rod. U.S. Pat. No. 892,628 discloses a ride on type stalk cutter having a draft beam, a pair of rearwardly diverging cutter bars, braces connected between the beam and cutter bars that mount the beam and a pair of runners having front ends attached to the cutter bars and the rear ends connected by braces to the beam. In German Pat. No. 512,283 diverging blades have front end portions connected by a brace that also mounts the front end of a runner and intermediate portions connected by an adjustable beam that also mounts the intermediate part of the runner.

One of the problems with such prior art weed cutters is that they do not have the desired rigidity when made for cutting relatively wide swaths and still being inclined to have cut weeds relatively easily slide off the rear ends thereof. Also such prior art weed cutters can not be folded for storage with all the parts other than the handle connected together.

In order to overcome problems such as the above as well as others, this invention has been made.

SUMMARY OF THE INVENTION

An underwater weed cutter having a pair of blade mounts that mount blades and are pivotally connected to a mounting member for movement between a weed cutting position diverging from one another in a direction away from the mounting member and a storage position that the blades extend generally parallel relative one another and at least a brace mountable for extending transversely between the blade mounts for retaining the blade mounts in diverging relationship in the weed cutter weed cutting position.

Advantageously there are provided three braces, two of which being runners having front ends pivotally connected to the respective blade mount, and a handle assembly that includes a combination weed deflector-runner.

One of the objects of this invention is to provide a new and novel underwater weed cutter that is foldable to a storage condition. A further object of this invention is to provide an underwater weed cutter having new and novel means for providing runners and adding rigidity. Another object of this invention is to provide an underwater weed cutter having a new and novel combination handle and weed deflector runner assembly. A still further object of this invention is to provide an underwater weed cutter having a new and novel pivotal mounting of the cutter blades and brace means for selectively retaining the blades in rigid diverging relationship and permitting folding movement of the blades to positions the blade cutting edges extend generally parallel and closely adjacent one another. Another object of this invention is to provide an underwater weed cutter having new and novel brace means, including a brace that along substantially its entire transverse dimension is shaped to exert a downward force on the blade mount as the cutter is pulled through the water.

BRIEF DESCRIPTION OF THE DRAWINGS

FIG. 1 is a plan view of the first embodiment of the underwater weed cutter of this invention in an assemblied condition for cutting a wide swath with most of the handle and weed deflector runner assembly broken away, said view being generally taken along the line and in the direction of the arrows 1—1 of FIG. 2;

FIG. 2 is a side view of the apparatus shown in FIG. 1 in the weed cutting position;

FIG. 3 is an enlarged fragmentary view showing the mounting member, portions of the handle and weed deflector runner assembly and the adjacent parts of the blades and blade mounts in the FIG. 1 position, said view being generally taken along the line and in the direction of the arrows 3—3 of FIG. 2;

FIG. 4 is a bottom view of the first embodiment in a folded condition, the handle assembly not being shown;

FIG. 5 is a side view showing part of the handle and weed deflector runner folded to a storage position and the adjacent part of the blade mounts, said view being generally taken along the line and in the direction of the arrows 5—5 of FIG. 4;

FIG. 6 is an enlarged plan view of the structure shown in FIG. 3 other than it is in the storage position, and shows portions of the knife guards on the blades;

FIG. 7 is a plan view of the handle and weed deflector runner assembly in a weed cutting position with intermediate parts of the handle mount and weed deflector runner broken away;

FIG. 8 is a transverse cross sectional view showing a blade mounted by a blade mount with a blade guard on the blade;

FIG. 9 is a fragmentary view of the first embodiment in a weed cutting position for cutting a narrow swath;

FIG. 10 is a fragmentary cross sectional view generally taken along the line and in the direction of the arrows 11—11 of FIG. 1;

FIG. 11 is a plan view of the structure shown in FIG. 10;

FIG. 12 is a fragmentary plan view of the second embodiment in a weed cutting position;

FIG. 13 is a fragmentary plan view of the third embodiment in a weed cutting position;

FIG. 14 is a fragmentary longitudinal cross sectional view showing a runner extended through the transverse brace, said view being generally taken along the line and in the direction of the arrows 14—14 of FIG. 13;

FIG. 15 is an enlarged fragmentary plan view of the transverse brace to show one of the slots therein;

FIG. 16 is an enlarged fragmentary bottom view of the third embodiment showing the transverse brace connected to one of the blade mounts;

FIG. 17 is an enlarged fragmentary plan view of the third embodiment showing the attachment of a blade mount to the mounting plate in a weed cutting position;

FIG. 18 is a fragmentary cross sectional view generally taken along the line and in the direction of the arrows 18—18 of FIG. 17 to show the structure for limiting the pivotal movement of the blade mount to its weed cutting position; and FIG. 19 is a fragmentary rear view of the third embodiment showing a runner rear portion extending through a slot in the rear brace.

For purposes of describing the structure of the first embodiment, it will be primarily assumed it is in it wide swath weed cutting condition.

Referring now to FIGS. 1-3, the first embodiment of the invention has a mounting member (base plate) 10, first and second elongated blade mounts 11 and 12 that respectively mount knifes (blades) 15 and 16. Advantageously each blade mount has a groove 19 extending the length thereof with the top vertical edge 18a of the mount transversely more remote from the blade cutting edge 20 than the lower vertical edge 18b thereof, the blades being secured to the mounts by screw or rivets 23 that extend into the lower portion of the respective mount (see FIG. 8). The first (front) end portion of the blade mounts 11, 12 are pivotally mounted on the mounting member 10 by pivots (rivets or nuts and bolts) 13, 14 respectively which are transversely spaced to permit the pivoting of the blade mounts relative to the mounting member as described hereinafter.

Intermediate the second (rear) ends of the blade mounts, but more closely adjacent to the blade mounts second ends than the first ends, an elongated transverse back brace 20 has it opposite ends pivotally connected to the mounts 11, 12 by connecting members (for example rivets) 21, 22 respectively. As shown in FIG. 1 brace 20 has two elongated brace members 20a, 20b that in the wide swath cutting condition each have one end portion removably connected to the other brace member by a removable cap pin and a cotter key 24 with pin 24 extending through aperture 25 in brace member 20a and aperture 26 in brace member 20b, and a cap pin 23 welded or otherwise fixed to brace member 20b and extended through a key hole slot 28 in brace member 20a which is remote from Pivot 21 (see FIG. 4 for relative positions of cap pins, apertures and slots). In the narrow swath cutting condition (see FIG. 9), brace members 20a, 20b are removably connected to one another by cap pin and cotter key 24 with the cap pin 24 extended through aperture 25 in brace member 20a and aperture 27 in brace member 20b, and cap pin 23 extended through key hole slot 29 in brace member 20a that is located adjacent pivot 21.

For providing rigidity to the cutter, there is provided a pair of longitudinally elongated, equally transversely spaced along the length thereof, braces (runners), generally designated 30, 31 that have their front ends 32 pivotally connected to blade mounts 11, 12 respectively by pivots (revits or other type fasteners) 34, 35 respectively at location intermediate and substantially spaced from the pivot connections of the mounts 11, 12 to the mounting member and the pivot connections of the brace 20 to the mounts. Each of the runners 30, 31 has a downwardly and rearwardly inclined portion 36 that at one end is integrally joined to portion 32 and an opposite end integrally joined to one end of a generally horizontal portion 37. The opposite end of portion 37 is integrally joined to one end of upwardly and rearwardly inclined portion 38 and has an opposite end integrally joined to one end of rear portion 39 that overlays the adjacent part of brace 20. Portions 32, 39 are generally parallel to portion 37. The rear portion of runner 30 has front and rear key hole slots 40, 41 respectively while the rear portion of runner 31 has key hole slots 42, 43 respectively. In the wide swath cutting position a cap pin 44 welded to brace member 20a is located to extend through key hole slot 40 of runner 30 for connecting the runner to brace member 20a while a cap pin 45 welded to brace member 20b is located to extend through key hole slot 42 to connect runner 31 to brace member 21b. In the narrow swath cutting position cap pin 46 that is welded to brace member 20a extends through key hole slot 41 and pin 47 that is welded to brace member 21b extends through key hole slot 43. As shown in FIGS. 10 and 11 for cap pin 44, key hole slot 40 and brace member 20a, each cap pin has a head portion spaced from the member on which it is mounted and a smaller diameter rod portion extended into an opening passing through said member and welded to said member while the key hole slot has a diametric portion (40a for slot 40) of a larger diameter than the cap pin for the cap pin head to be inserted through and a narrow portion (40b for slot 40) for the rod portion to move into but through which the head portion can not be moved through.

The intermediate portions 37 of the runners are located below the plane of the blade mounts and in positions that without the handle 58 attached, the weed cutter will be supported entirely by said portions 37 when placed on a hard horizontal surface in a weed cutting assembled condition.

Referring to FIGS. 1-3 and 5, a handle and weed deflector runner mounting assembly, generally designated 50, includes a pivot member 53 extended through the web portion of a generally U-shaped bracket 51, the base plate and a spacer 52 with the spacer between the web portion and base plate to mount the bracket for pivotal movement about an axis parallel to the pivot axes of pivots 13, 14. The spacer permits the blade mounts being pivoted to positions that in part are located between the bracket and base plate. As may be noted in FIG. 3, pivots 13, 14, 53 are located at the apexes of an isosceles triangle with pivots 13, 14 being at the base and forwardly of pivot 53 in the weed cutting positions (see FIGS. 2 and 3). The terminal end portions of the legs of the bracket 51 mounts a pivot member 54 that in turn pivotally mounts one end portion of a handle mounting tube 55 for pivotal movement about an axis parallel to the plane of the blade mounts perpendicular to the pivot axes of pivots 13, 14).

Referring in particular to FIGS. 5 and 7, a handle, generally designated 58, includes a tube 59 (handle section) that at one end mounts suitable means, for example eye bolt 63, for being attached to a boat, for example by a rope passed through the eye bolt and tied to the boat. The opposite end of the tube telescopically receives one end portion of a narrower diameter tube 62, the one end of the tube 62 mounting a snap fastener having protrusions 61 resiliently retained in positions extending through apertures in the adjacent ends of tubes 59, 62. The opposite end portion of tube 62 telescopically extends into one end portion of a larger diameter tube 64 and mounts a conventional snap fastener having protrusions 65 resiliently retained in positions extending through apertures in the adjacent ends of tubes 62, 64. The opposite end of tube 64 telescopically receives the adjacent end portion of mounting tube 55 which mounts a snap fastener having protrusions 67 resiliently retained in positions extending through apertures in the adjacent ends of tube 55, 64. In order to separate one tube from another, or for example push tube 62 so that it telescopically further extends into tube 59, the respective set of protrusions have to be manually forced towarded one another to be nearly entirely located within the larger diameter tube before the adjacent tubes can be moved relative one another. If the protrusions of the respective snap fastener are not manually pushed toward one another the adjacent tubes are retained in fixed positions relative one another. Since the snap fasteners are conventional and other suitable means can be used to fasten the tubes together, the snap fasteners will not be further described.

To prevent weeds catching between the mounting tube 55 and the part of the base plate therebeneath, end portion 57a of a weed deflector runner (guard) 57 is bolted or welded to the part of tube 64 adjacent tube 55. With tube 64 and the blade mounts extending generally parallel to the horizontal, tube 64 extending forwardly of the blade mounts and the guard beneath tubes 55, 64, guard intermediate portion 57b at one end is integrally joined to portion 57a to extend rearwardly thereof and diverge away from tube 55 to have its opposite end located beneath and substantially spaced from the base plate 10. The opposite end of portion 57b is integrally joined to the front end of portion 57c with portion 57c extending rearwardly beneath the base plate and diverging away from the tubes 64, 55 in a rearward direction at a much smaller angle than the angle of divergency of portion 57b when the tube and blade mounts extend as set forth in the preceeding sentence. Further when the tube 55 and blade mounts are in the last mentioned position the terminal end of portion 57c is vertically spaced from the plane of the blade mounts by about the same dimension as the spacing of runner portions 37 from said plane. Thus the guard during weed cutting operations serves as a runner, depending on the angle of tube 55 to the horizontal and the firmness of the lake bottom and to deflect weeds that are in its path as the cutter is being pulled forwardly. Even though not shown the transverse dimension of portion 57a can be smaller then the outer diameter of tube 55 and portion 57b be of increasing transverse widths in a direction away from portion 57a, for example portion 57b at its juncture to portion 57c of a width the same or slightly greater than the diameter of the base plate.

Even though it is preferred that the weed deflector runner be attached to tube 64 because it can be separated from tube 55 for taking up less space for shipping and storage purposes, it is to be understood that tube 55 could be of about the combined length of the tube 55 and the part of tube 64 shown in FIG. 5 with portion 57a secured thereto in the same spaced relationship from pivot 54 as shown in FIG. 5 and tube 64 connected to the thus modified tube 55 in the manner previously described. With the deflector runner attached to the thus modified tube 55 and tube 64 separated from tube 55, prior to moving the blade mounts from their weed cutting positions to their storage positions as will be subsequently described, the deflector runner is first pivoted in the direction of arrow 72 about pivot 54 from the FIG. 2 position to a position that the entire deflector runner is located on the same side of the plane of the blade mounts as pivot 54 and thereafter is pivoted about 180° in either the direction of arrow 73 (or the opposite direction) about pivot 53 to be located relative the blade mounts (after the blade mounts have been pivoted to their storage position) to the position such as indicated in FIG. 5. Depending on the length of tube 55 as shown in FIG. 5, it may be advantageous to pivot it relative the base member 10 as described relative the modified mounting of the weed deflector runner.

Assuming the first embodiment of the weed cutter is in the storage condition of FIGS. 4-6, other than the handle is disconnected from the mounting tube 55, blade mounts 11, 12 with the blade guards 110 on the blades are pivoted about pivots 13, 14 respectively through angles greater than 90° in opposite directions (arrows 74, 75) to about the FIG. 1 and 3 positions. In the event end portion 39 of runner 30 is secured to mount 11 by a cap pin (and cotter key) extended through the narrow part of key hole slot 41 and aperture 77 in mount 11 the cap pin is removed and then runner 30 is pivoted in the direction of arrow 82 about pivot 34 to about the position of FIG. 1; and if a cap pin (and cotter key) is extended through the narrow part of key hole slot 43 and aperture 78 in mount 12 the last mentioned cap pin is removed and runner 31 is pivoted about pivot 35 in the direction of arrow 83 to about the position shown in FIG. 1. Brace member 20a is pivoted in the direction arrow 79 about pivot 21, and if necessary runner 30 moved so that cap pin 44 is beneath the diametric enlarged portion 40a of runner slot 40, next the head end moved through the slot, and then brace member 20a pivoted about pivot 21 in the direction opposite arrow 79 so that the rod (stud) portion of the cap pin moves down into the narrow part 40b of the slot. Likewise brace member 20b is pivoted about pivot 22 in the direction of arrow 80 to position cap pin 45 beneath slot 42 of runner 31, insert pin 45 through the slot and the brace member pivoted to move the cap pin into the narrow part of the slot.

During the time of pivoting brace member 20b it is pivoted to move cap pin 23 beneath key hole slot 28 and then extend it thereinto. If necessary brace members 20a, 20b are then moved relative one another to align apertures 25, 26 and cap pin 25 has its rod portion extended therethrough and a cotter key used for retaining the cap pin in place. At this time brace members 20a, 20b provide the linear brace 20. Further at this time cap pin 23 is located in the narrow part of key hole slot 28 whereby the brace members are prevented from pivoting about pivots 21, 22.

Additionally since cap pins 45, 46 are in the narrow parts of key hole slots 40, 42 the runners are prevented from pivoting about pivots 34, 35. As a result the blade mounts are rigidly retained in their weed cutting positions. It is to be noted after the cap pins 44, 45 have been inserted in slots 40, 42 and prior to attempting to insert cap pin 23 into slot 28, if the base plate is not in a position that pivots 13, 14 are located so that a line passing through the central axes of pivots 13, 14 is parallel to brace 20 when pin 24 is extended through apertures 25, 26 and cap pin 23 extends in slot 28, the mounting member 10 may have to be rotated to position said pivot axes to be nearly parallel to brace 20 before the cap pin 23 is extended into slot 28 and/or pin 24 is extended through apertures 25, 26 so that the apertures can be aligned. Thereafter, if the handle mounting tube 55 is not already in a position that the snap fastener protrusions 67 are located generally forwardly of pivot 54, tube 55 is pivoted in the direction of arrow 72 about pivot 52 and/or arrow 73 about pivot 53 to such a position and tubes 59, 62, 64 telescopically connected together with tube 64 being telescoped into tube 55 to have protrusions 67 extend through the aperture of the adjacent end of tube 64. It is noted that the protrusions have to be sufficiently manually depressed before the tubes can be telescopically connected. Now eye bolt 63 can be suitably connected to a boat and the cutter pulled through the water to cut weeds. Pivot 54 permits the handle pivoting relative the bracket 51 for varying depths of the body of water while the base member and blade mounts together with the structure mounted by the blade mounts can pivot as a single unit relative the bracket 51 in the direction of arrow 73 or the opposite direction in the event one of the knife blades stricks, for example a rock, to swing around the rock, and then as the cutter is pulled forward pivot back to the position shown in FIG. 1. Further the runners 30, 31 and deflector runner 57 make it easier to pull the cutter along the lake bottom.

In both the position of FIG. 1 and FIG. 9, the runners are retained in parallel relationship with one on each side of and equally spaced from a vertical plane bisecting the angle of divergence of the blade mounts as is true for the second embodiment which is described below.

When it is desired to store the first embodiment of the weed cutter in its folded condition, the reverse proceedure is followed, i.e. pin 24 removed, then cap pin 23 moved out of slot and etc. It is to be noted that between the tolerances of the connections of the brace members to the blade mounts and slight resilience of the brace members, the brace members 20a, 20b can be moved so that the heads of the cap pins abut against the bottom surfaces of the blade mounts (cap pin 23 against the bottom surface of base member 10), and runner member portions moved relative the brace members 20a, 20b as described.

In the event the weed cutter is to be used for cutting a narrow swath of weeds the manner of unfolding it is the same as previously described except for the differences noted hereinafter. In place of cap pin 44 being inserted into slot 40 and cap pin 45 into slot 42, cap pin 46 is inserted into slot 41 and cap pin 47 is inserted into slot 43. Further instead of cap pin 23 being inserted in slot 28, cap pin 23 is inserted into slot 29 and instead of pin 24 being inserted through apertures 25, 26, pin 24 is inserted through apertures 25, 27. Thus the first embodiment is in the condition of FIG. 9 with the angle of the rearward divergence of the blade mounts being smaller than that of FIG. 3. The first embodiment can be used in the FIG. 1 or FIG. 9 position, depending on the power required to pull the weed cutter and the power of the boat used to pull it.

If the relative widths of the blade mounts, brace members 20a, 20b and runners 30, 31 is such that when the runners and blade mounts are parallel or nearly parallel and the transverse spacing between the ends of the runners that are pivotally mounted on the blade mounts is only slightly greater than the width of one of the brace members 20a, 20b with the spacing of pivots 21, 34 from the edge of mount 11 opposite blade 15 being the same and equal to the spacing of each of pivots 22, 35 from the edge of mount 12 opposite blade 16 being equal, in the folded condition brace member 20a can extend between mount 11 and the adjacent part of runner 30 in substantially parallel relationship, and in such position with runner 31 being substantially parallel to mount 12, brace member 21b can extend between the ends of the runners that are pivotally attached to the mounts and diagonally to have the end portion that mounts pin 23 in overhanging relationship to pivot 13 as viewed in FIG. 4. Depending on the widths of the runners and brace member 20b the rear ends of the knife guards may be transversely spaced, and if so, such spacing preferrably would be less than the spacing of pivots 13, 14 from one another.

Referring to FIG. 12, the second embodiment of the invention, generally designated 88, includes blade mounts 89, 90 that respectively mount blades 91, 92 and are the same as that of the first embodiment. Further the blade mounts are pivotally mounted on a base plate 10 by pivots 13, 14 as has been shown and described relative the first embodiment. Longitudinal runners (braces) 93, 94 have their front ends pivotally connected to blade mounts 89, 90 by pivots 34, 35 respectively. The rear end portion of each of the runners has a key hole slot (not shown) that is of the same size and shape and oriented the same as described and shown for slot 40 of the first embodiment. The runners 93, 94 may be the same as runners 30, 31 except that the rear end portions are shorter and there is only one key hole slot in each runner.

A transverse rear brace 96 that is made of a single piece of material has its one end connected to mount 89 intermediate pivot pivot 34 and the rear end of mount 89 by a removable fastener (for example a cap pin and cotter key) 97 extended through apertures in the mount and brace. Similarly the opposite end of brace 96 is connected to mount 90 by a removable fastener (for a cap pin and cotter key) 98. Intermediate the opposite ends of the brace 96 the brace is provided with transversely spaced cap pins 102, 103 that are respectively removably extended through the key hole slots in runners 93, 94 and welded or otherwise fastened to the brace 96 in a manner corresponding to that shown for cap pin 44 and brace member 20 in FIG. 10. The cap pins are located so that the runners are parallel when the weed cutter is in its weed cutting position.

In order to fold the cutter 88 to a storage position the removable of the handle and the movement of the handle mounting assembly is the same as that described relative the first embodiment. However with the second embodiment at least one of fasteners 97, 98 has to be removed. Assuming that fastener 98 is removed, than brace 96 can be pivoted in the direction of arrow 104 about fastener 97 to move the cap pin 103 into the enlarged diametric portion of the key hole slot in runner 94 and then the rear portion of the runner 94 moved relative the cap pin 103 to clear the cap pin. Likewise brace 96 is slightly further pivoted in the direction of arrow 104 and then runner 93 is moved relative to the brace to move the cap pin 102 out of the slot in runner 93. Now the brace may be pivoted in the direction opposite arroe 104 to a position that a part thereof is closely adjacent the mounting plate 10. Thereafter the blade mounts may be pivoted in opposite directions about pivots 13, 14 to have the blades facing and adjacent one another; and runners 93, 94 respectively pivoted about pivots 34, 35 in the direction of arrows 105, 106 to positions relative to the blade mounts corresponding to the positions shown in FIG. 4 for runners 30, 31 relative mounts 11, 12. If desired cap pins and cotter keys can be used with one pin extending through the key hole slot in runner 93 and aperture 108 in mount 89 and the other through the key hole slot in runner 94 and aperture 109 in mount 90. In the event brace 96 extends further on the opposite side of pivot 13 from fastener 97, fastener 97 can be removed to completely disconnect the brace from the blade mounts. It is to be noted in place of initially just removing fastener 98, both fasteners 97, 98 can be removed and that the brace translated toward the base plate 10 and then moved relative the runner to withdraw the cap pins 102, 103 through the key hole slots in the runners 93, 94. The procedure for reassembling the second embodiment from the storage condition to a weed cutting position is the reverse of that set forth above for preparing the cutter for storage.

In the event the second embodiment is to be made adjustable for cutting both wide and narrow swaths and the transverse back brace 96 used, each of blade mounts 89, 90 can be provided with apertures for fasteners 97, 98 equally spaced from and on the opposite side of the apertures for fasteners 97, 98 of FIG. 12 from pivots 34, 35, the runners the same as runners 30, 31 pivotally mounted by the blade mounts 89, 90, and a cap pin for the rear key hole slot in the runner mounted by mount 89 secured to the brace 96 between cap pin 102 and fastener aperture for fastener 97, and another cap pin for the rear key hole slot in in the runner mounted by mount 90 secured to the brace 96 between cap pin 103 and the fastener aperture for fastener 98. The thus modified second embodiment could be used for cutting a narrower swath than that cut by the structure of FIG. 12.

With reference to each of the embodiments, in place of providing cap pins that are welded or otherwise fixed to the transverse brace other type fasteners can be used. For example apertures can be provided at the locations of the cap pins that are fixed to the cutter, circular apertures used in place of key hole slots and removable cap pins and cotter key combinations used for connecting the runners to the back brace; and a second cap pin and cotter key 24 and circular apertures used in place of key hole slots 29, 28 and cap pin 23. Obviously nuts and bolts could be used in place of cap pins and cotter keys combinations.

Not previously mentioned, during the time the cutter is not being used, and particulary during the time the cutter is being assembled to its weed cutting condition or folded to its storage condition, it is preferred that conventional resilient blade guards 110, which are generally U-shaped in transverse cross section, be provided on each of the blades to extend the length thereof and that form a friction fit with the blades so that they have to be manually removed from the blades prior to using the cutter.

Advantageously the runners, back brace and blade mounts are made of aluminum and that added weight (for example sand and appropriate plugs—not shown) be provided in tube 55 to aid in retaining the base plate adjacent the lake bottom and the runners 30, 31, 93, 94 on the bottom.

Even though the blade mounts of both embodiments can be mounted on the mounting member to be pivoted through angles of less than 90° to positions that their trailing edges 18c abut against one another are are adjacent and parallel to one another in a storage position with pivot 53 being on the opposite side of the plane of the pivot axes of pivots 13, 14 in the weed cutting condition from that shown in FIG. 3, decreasing the spacing of the pivots 13, 14 and rounding of the corners of mounts 11, 12 to permit them being pivoted into trailing edges abutting relationship; it is preferred that each blade be pivotable through an angle of greater than 120° to be generally parallel to one another (or an angle of less than 10° divergence) in a storage position so that in the storage position the cutting edges do not face outwardly of one another.

As an example of the invention but not otherwise as a limitathereon, each of the blade mounts may be 5' in length, the runners 30, 31 about 28" in lengths, and each of the handle sections 59, 62, 64 about 5" or 6' in length, the angle between blade mount 11 and brace member 20a in the wide swath cutting position about 40°–50° and the narrow swath cutting position about 60°–65° whereby, for example swaths of about 7' and 5' widths can be cut.

Referring to FIGS. 13–18, the third embodiment of the invention, generally designated 109, includes blade mounts 111, 112 that respectively mounts blades 115, 116 and are the same as the first embodiment. Further the blade mounts are pivotally mounted on a base plate 114 by pivots 13, 14 as has been described relative to the first embodiment. Instead of being circular as is base plate 10, base plate 114 is rectangular and has a pair of protrusions 113 which may be bent up portions of the plate that extend above the main body of the plate to limit the pivotal movement of the blade mounts from their storage position to their weed cutting position. Of course separate members may be attached to the base plate to serve the same function.

Longitudinal runners (braces) 130, 131 have their front end portions pivotally connected to blade mounts 111, 112 by pivots 34, 35 respectively. The runners 130, 131 may be the same as runners 30, 31 except their rear end portions 144, 143 are longer and no key hole slots or apertures are provided therein.

A transverse rear brace, generally designated 120, that is made of a single piece of material has its one end connected to mount 111 by a removable fastener (for example a cap pin and cotter key) 136 extended through apertures in the horizontal leg 121 of the rear brace and the mount 111. Similarly the opposite end of the brace 120 is connected to mount 112 by a removable fastener 137 extended through apertures in leg 121 and mount 112.

The rear brace also includes a leg 122 that is inclined upwardly in a rearward direction that along its lower transverse front edge is integrally joined at 124 to the rear transverse edge of the horizontal leg. Advantageously leg 122 may be inclined upwardly and rearwardly relative the top surfaces of the rear portions 144, 143 of runners 130, 131 at an angle of about 40°.

The rear brace is provided with a cut-out 123 at each end whereby the inclined leg is shorter than the horizontal leg and the inclined leg extends upwardly above the transverse adjacent parts of the blade mounts and is located therebetween.

Intermediate the opposite ends of the brace it is provided with transversely spaced slots 126. Each slot is of a transverse dimension only slightly greater than the transverse dimension of the rear horizontal portion of a runner. Further each slot has a front edge 126a that is located forwardly of the juncture 124 of the legs by a dimension about the same as the thickness of the rear part of a runner. The rear brace has a transverse wall portion defining a rear edge 126b of each slot 126 that is rearwardly of juncture 124 by a dimension that when a runner is extended through the slot with the horizontal leg parallel to and abutting against the undersurface of the mounts and the rear portions of the runners, edges 126b at their juncture with the undersurfaces of the inclined leg will abut against the top surfaces of the rear portions of the runner. Advantageously the wall portions defining edges 126b are perpendicular to the undersurfaces of legs 122. Thus as may be noted from FIGS. 14, 15 and 19 the rear portions of the runners 130, 131 are rectangular in cross section, and as view from the rear the slots are rectangular and of sizes only slightly larger than the rear portions of the runners while in plan view the slots are much larger than as viewed from the rear.

The slots are transversely spaced and located relative to fasteners 136 such that when the fasteners connect the opposite ends of the brace to the blade mounts, the runners are parallel to one another with the runners rear portions extending through the respective slot to permit the brace being replaced as will be described. Due to the inclination of the inclined leg relative to the the horizontal leg, the part of each slot provided in the horizontal leg is of a much smaller longitudinal length than the corresponding dimension of the portion of the slot provided in the inclined leg. Additionally the inclined leg is of a transverse dimension to extend substantially the entire distance between the fasteners 136, 137.

The third embodiment includes a handle and weed deflector runner assembly, generally designated 150, that is of the same construction as that of the first embodiment, and a handle tube 55 and a weed deflector runner (guard) 157 that are the same as those of the first embodiment, other than that the runner 157 has an end portion that is of increasing transverse dimensions in a direction away from its attachment to the handle tube 55. That is the assembly 150 includes a bracket 51, spacer 52, pivot member 53 and a pivot member 54 for connecting the handle tube 55 to the base plate 114 in the same manner shown in FIGS. 3 and 5 for the first embodiment and described with reference thereto.

Blade guards 110 are provided for blades 115, 116.

Assuming the third embodiment is in its storage condition wherein the blade mounts extend substantially parallel to one another with the blade guards adjacent one another, the blade mounts are pivoted about pivots 13, 14 respectively through angles greater than 90° in the dirctions of arrows 140, 141 respectively to positions shown in FIG. 13 and the handle tube is also pivoted to the position shown in said Figure. In the FIG. 13 position the blade mounts each abut against a protrusion 113 to prevent further pivoting in the directions of arrows 140, 141 respectively. Now the runners 130, 131 are pivoted about pivots 34, 35 to positions to be parallel to one another.

With the rear brace 120 removed and the blade mounts and runners in the positions shown in FIG. 13 and the rear brace rearwardly of runner portions 144, 143, the rear brace is moved to extend perpindicular to the direction of extension of the runners. Further the rear brace is tilted so that the transverse edges of cutouts 123 are below the bottom surfaces of the blade mounts and leg 121 along its transverse dimension is inclined upwardly and rearwardly so that edges 126a are at a slighly lower elevation than the bottom surfaces of the runner rear portions. Now the rear brace is moved forwardly to have the runners rear portions extend through slots 126 and then is moved generally in the dirction of arrow 143 about transverse axes so that leg 121 is in substantial flat abutting relatioship to the undersurfaces of the rear portions of the runners 130, 131 such as indicated in FIG. 14 for rear portion 144. That is the top surface of leg 121 is substantially parallel to the undersurfaces of rear portions 143, 144 and extends generally horizontally.

At this time if the apertures (not shown) in legs 121 are not aligned with corresponding apertures in the blade mounts for fasteners 136, 137, the rear brace is moved so that the respective set of apertures are in alignment and fasteners 136, 137 are used for connecting the opposite end portions of the rear brace to the adjacent blade mount. This retains the now top surface of leg 121 in or nearly in abutting relationship to the bottom surfaces of the blade mounts and prevents the blade mounts 111, 112 being pivoted about pivots 13, 14 in the direction opposite arrows 140, 141. It is noted that at this time protrusions 113 prevent the blade mounts being pivoted in the direction of the arrows 140, 141. Further fasteners 136, 137 and leg 121 in abutting against the blade mounts prevent the rear brace being pivoted any significant amount in the direction opposite arrow 143 while the then upper surface of leg 121 and edges 126b prevent any significant up or down movement of the runner rear portions relative the blade mounts. Additionally the rear portions 144, 143 in abutting against the longitudinal edges of the slots 126 retain the runners in substantially parallel relationship. Also the rear portions of the runners 130, 131 extend sufficiently rearwardly of the rear brace that they can not pull (slide) out of the slots as long as fastners 136, 137 connect the rear brace to the blade mounts.

By providing the rear brace (fin) with the inclined leg 122, as the cutter is pulled through the water, a downward force is exerted on the cutter to aid in keeping the cutter on the bottom of the body of water during the weed cutting operation. Additionally by providing the slots in the rear brace, removable fasteners do not have to be provided for retaining the rear end portions of the runners 130, 131 in the desired spaced relationship.

When the weed cutter is to be stored, blade guards are placed on blades 115, 116. Then fasteners 136, 137 are removed and thence the rear brace is tilted slightly and moved rearwardly relative to the runners. Now the runners can be pivoted about their respective pivot 34, 35 to extend at least nearly parallel to the repective blade mount and the handle tube pivoted relative to the base plate as described relative to the first embodiment. Thereafter the blade mounts and the runners are pivoted about pivots 13, 14 in the directions opposite arrows 140, 141 respectively to extend at least nearly parallel to one another (i.e. through angles greater than 90°) with the blade guards in abutting or nearly in abutting relationship to the weed cutter storage position.

What is claimed is:

1. For cutting weeds adjacent to the bottom of a body of water, an underwater weed cutter comprising a front mounting member for being pulled through the water, a first and a second elongated cutter member that each has a front end portion, a rear end portion, a leading cutting edge and a trailing edge opposite the leading edge, first means mounting the cutter members front end portions on the the mounting member for pivotal movement relative to one another to permit the cutter members being pivoted to positions of different diverging relationships relative to one another, including a weed cutting position in diverging relationship at a given angle, a first and a second runner that each has a first and a second end portion, second means for pivotally attaching the first runner first end portion to the first cutter member in spaced relationship to the first means, third means for pivotally attaching the second runner first end portion to the second cutter member in spaced relationship to the first means, and fourth means for retaining the cutter members at least substantially at said given angle of diverging relationship and maintaining the runners substantially parallel to one another, and alternately permitting the cutter members being pivoted relative one another and the first and second runners being pivoted about the third and fourth means relative to the first and second cutter memers respectively, said fourth means including transversely elongated brace means having an intermediate portion in removable association with the runners rear portions for releasably retaining the runners substantially parallel to one another, a first end portion, a second end portion, a first fastener for attaching the brace means first end portion to the first cutter member on the opposite side of the third means from the first means and a second fastener for attaching the brace means second end portion to the second cutter member on the opposite side of the fourth means from the first means.

2. The apparatus of claim 1 further characterized in that the brace means includes wall portions defining a first and a second slot that are in transverse spaced relationship to have the first and second runner rear end portions extended therethrough when the runners are in parallel relationship and the first and second fasteners connect it to the cutter members.

3. The apparatus of claim 1 further characterized in that the brace means comprises a first and a second elongated brace member that each has a first end portion and a second end portion, and disconnectable fastener means for releasably securing the the rear end portions of the runners to at least one of the brace members in transverse spaced relationship and the brace members second end portions together so that one brace member constitutes a linear extension of the other, that the first fastener comprises a first pivot member for pivotally attaching the first brace member first end portion to the first cutter member and that the second fastener comprises a second pivot member for pivotally attaching the second brace member second end portion to the second cutter member.

4. The apparatus of claim 1 further characterized in that each runner rear portion has a key hole shaped slot, that the first fastener is a removable fastener, that the second fastener comprises a pivot member, that the brace means comprises a transversely elongated brace having a first end attached to the first cutter member by the first fastener, a second end attached to the second cutter member by the pivot member, and an intermediate portion, a pair of transversely spaced cap pins fixed to the brace intermediate portion and extended throught the respective key hole slot for releasably retaining the runners in parallel relationship, the key hole slots being oriented that with the cutter members in a weed cutting position the first fastener has to be removed before the brace can be moved relative to the runners and cutter members to permit the cap pins being moved throught the respective slot for disattaching the runners from the brace.

5. For cutting weeds adjacent to the bottom of a body of water, an underwater weed cutter comprising a front mounting member for being pulled through the water, a first and a second elongated cutter member that each has a front end portion, a rear end portion, a leading cutting edge extending at least a major portion of the length thereof and a trailing edge, first means for mounting the cutter member front end portions on the mounting member, said first means including means connecting the cutter members front end portions to the mounting member for pivotal movement relative thereto and one another between a storage position that the cutter members are parallel or diverge from one another at an angle of less than about 10° and a weed cutting position diverging from one another at an angle substantially greater than 10°, and brace means located rearwardly of the mounting member for retaining the cutter members in diverging relationship away from the mounting member with the cutting edges transversely more remote from one another along their lengths than the trailing edges, said brace means including first and second runners extending forwardly and rearwardly in parallel relationship between the cutter members for engaging the bottom of the body of water at a lower elevation than the cutter members during a weed cutting operation that each has a front end portion and a rear end portion, second means for attaching the first runner front end portion to the first cutter member, third means for attaching the second runner front end portion to the second cutter member, a transverse back brace extending between the cutter members and having a first end portion and a second end portion, fourth means for attaching the brace first end portion to the first cutter member opposite the second means from the first means, fifth means for attaching the brace second end portion to the second cutter member opposite the third means from the first means, sixth means for attaching the first runner second end portion to the brace transversely between the fourth and fifth means and spaced therefrom and seventh means for attaching the second runner second end portion to the brace transversely between the fifth and sixth means and spaced therefrom, each of the second through seventh means comprising one of a pivot member and a disconnectable fastener for retaining the cutter members in their weed cutting position and alternately permitting movement of the brace and the runners relative to one another and the cutter members to allow the cutter members being pivoted to their storage position.

6. The apparatus of claim 5 further characterized in that each of the second and third means comprise a pivot member for mounting the first and second runners on the first and second cutter members respectively for pivotal movement from positions the runner extend generally parallel to the cutter member on which it is mounted in the storage position, to positions generally parallel to one another when the cutter members are in their weed cutting position.

7. The apparatus of claim 6 further characterized in that each of the sixth and seventh means is a disconnectable fastener and that at least one of the fourth and fifth means is a disconnectable fastener.

8. The apparatus of claim 7 wherein each of the fourth and fifth means is a disconnectable fastener that is removable from the brace and the respective cutter member and that each of the sixth and seventh means comprises a cap pin having a rod portion fixed to one of the brace and the respective runner and is extendable through a key hole shaped slot in the other with the key hole slots oriented that with the cutter members in a weed cutting position, at least one end of the brace has to be disconnected from the adjacent cutter member before the brace can be moved relative the runner and the cutter members to permit the cap pins being moved through the respective slot for disattaching the runners from the brace.

9. The apparatus of claim 5 further characterized in that the back brace comprises a first and a second elongated brace member that each has a first end portion and a second end portion, that the fourth means comprises a pivot member for pivotally attaching the first brace member first end porton to the first cutter member, that the fifth means comprises a pivot member for pivotally attaching the second brace member first portion to the second cutter ember, the second through fifth fastener having parallel pivot axes, and eighth disconnectable fastener means for selectively connecting the first and second brace members together intermediate the fourth and fifth means to retain the brace members that one constitutes a linear extension of the other in the cutter members weed cutting position and disconnecting the brace members whereby the first and second brace members can be pivoted to have their second end portions substantially more closely adjacent the first pivot means than when they constitute a linear extension of one another.

10. The apparatus of claim 9 wherein the weed cutter is optionally usable for cutting a wide swath and a narrow swath, further characterized in that the eighth means includes means to selectively retain the brace members in a first linear extension condition for cutter members wide swath cutting condition and a second linear extension condition that the brace members first end portions are more closely adjacent one another than in the first linear extension condition for cutter members narrow swath cutting condition, and that each of the sixth and seventh means includes means for attaching the respective runner to the brace at different locations relative to each of the brace and runners in the cutter members wide swath condition than the narrow swath cutting condition so that the runners are in substantial parallel relationship in each of the wide swath and narrow swath cutting conditions.

11. The apparatus of claim 5 further characterized in that the first means includes first and second pivots for respectively mounting the first and second cutter members front end portion on the mounting member for pivotal movement about parallel axes that are spaced from one another.

12. The apparatus of claim 11 further characterized in that there is provided an elongated handle having a front end portion and a rear end portion for pulling the cutter members in a forward direction and means for removably mounting the handle on the mounting member.

13. The apparatus of claim 12 further characterized in that there is provided a weed deflector runner that is mounted by one of the handle and handle mounting means for extending from an elevation above and forwardly of the mounting member to an elevation below the mounting member when the mounting member is pulled in a forward direction.

14. The apparatus of claim 13 further characterized in that the handle mounting means includes a handle mounting member and means mounting the handle mounting member for pivotal movement about a pivot axis parallel to the pivot axes of the first and second pivots and a pivot axis perpendicular to the pivot axes of the first and second pivots.

15. The apparatus of claim 14 further characterized in that the first and second pivots mount the cutter members on the mounting member for pivotally movement in a common plane, that in the cutter members weed cutting position the pivot axis of means for mounting the handle mounting member is parallel to, rearwardly of and transversely between the pivot axes of the first and second pivots, and that the handle includes a plurality of handle sections removably connected in end to end relationship.

16. For cutting weeds adjacent the bottom of a body of water, an underwater weed cutter comprising a front mounting member for being pulled in a forward direction through the water, a first and a second elongated cutter member that each has a front end portion, a rear end portion, a leading cutting edge extending at least a major portion of the length thereof and a trailing edge opposite the leading edge, first means mounting the cutter members front end portions on the mounting member for pivotal movement of the cutter members through angles greater than 9020 between a weed cutting position that they extend rearwardly in diverging relationship with the cutting edges along their lengths are transversely more remote from one another than the trailing edges and a storage position that the cutting edges along their lengths are transversely more closely adjacent one another than their trailing edges and brace second means extending between the cutter members rearwardly of their front end portion for retaining the cutter members in their weed cutting position and alternately movable relative the cutter members whereby the cutter members can be pivoted through angles greater than 90° to their storage position.

17. The apparatus of claim 16 further characterized in that the brace means include an elongated transverse back brace having a first end portion, an intermediate end portion and a second end portion, second means for fastening the brace first end portion to the first cutter member and third means for fasening the brace second end portion to the second cutter member, at least one of the second and third means including removable means for selectively mounting the respective brace end portion to the respective cutter cutter member and disconnecting the the respective brace end portion from the respective cutter member.

18. The apparatus of claim 17 further characterized in that the first means includes a first and a second pivot for mounting the first and second cutter members front end portions respectively on the mounting member for pivotal movement about parallel axes in opposite angular directions between the cutter members weed cutting positions and their storage position and that the brace means includes a second and third brace that each has a first end portion and a second end portion, third means for fastening the second brace first end portion to the first cutter member intermediate the first pivot and the second fastening means, fourth means for fastening the second brace second end portion to the back brace intermediate portion, at least one of the third and fourth means being a detachable fastener, fifth means for fastening the third brace first end portion to the second cutter member intermediate the second pivot and the third fastening means, and sixth means for fastening the third brace second end portion to the back brace intermediate portion, at least one of the fifth and sixth means being a detachable fastener.

19. The apparatus of claim 16 further characterized in that the brace means includes a first and a second brace that each has a first end portion and a second end portion, third means for pivotally connecting the first brace first end portion to the first cutter member between the first pivot and the second means, fourth means for pivotally connecting the second brace first end portion to the second cutter member between the second pivot and the third means and fifth means for acting in cooperation with the first and second braces to retain the cutter members in their weed cutting position and alternately permitting members being moved to their storage position.

20. The apparatus of claim 19 further characterized in the fifth means includes a back brace, said back brace including a first and a second brace member that each has a first end portion, said third means connecting the first brace member first end portion to the first cutter member for pivotal movement about an axis parallel to the pivot axes of said pivots, said fourth means connecting the second brace member first end portion to the second cutter member for pivotal movement about an axis parallel to the pivot axes of said pivots, means for removably fastening the brace members together to constitute an extension of one another, and means for removably fastening the first and second braces second end portions to the back brace in spaced relationship.

21. The apparatus of claim 16 further characterized in that the first means includes third means for abutting against the cutter members to limit their pivotal movement from their storage position toward their cutting position to be in a preselected diverging relationship, that the brace means includes a first and a second brace that each has a first end portion and a second end portion, a transverse back brace having a first end portion, a second end portion and an intermediate portion, fourth means for removably fastening the back brace first end portion to the first cutter member, fifth means for removably fastening the back brace second end portion to the second cutter member, a second and a third brace that each has a first and a second end portion, sixth means for pivotally fastening the second brace first end portion to the first cutter member intermediate the first means and the fourth means, seventh means for pivotally fastening the third brace first end portion to the second cutter member intermediate the first means and the fifth means, said back brace having a pair of transversely spaced slots for the second and third braces rear end portions to extend through to retain said second and third brace rear end portions in transverse spaced relationship when the back brace end portions are attached to the cutter members by the fourth and fifth means and to permit the back brace being moved away from the second and third braces when the fourth and fifth means are removed from connecting the back brace to the cutter members.

22. The apparatus of claim 21 further characterized in that the back brace comprises a fin for exerting a downward force on the second and third braces and the cutter members when the cutter is pulled forwardly under water to cut weeds, and includes a first leg having end portions fastened to the first and second cutter members by the fourth and fifth means, and a transvely elongated second leg to extend at least a major portion of the distance between the fourth and fifth means when the back brace is attached to the cutter members by the fourth and fifth means and joined to the first leg to extend rearwardly of the first leg in an upward direction during a weed cutting operation.

23. The apparatus of claim 22 further characterized in that the second and third brace rear end portion each has an upper surface and a lower surface, that the first leg has an upper surface abuttable against the second and third brace rear end portion lower surfaces when the second and third brace rear end portions extend through the slots and that the second leg has wall portions defining said slots, including slot edges abuttable against the second and third braces rear end portions when they extend through said slots.

24. For cutting weeds adjacent to the bottom of a body of water, an underwater weed cutter comprising first and second elongated cutter members that each has a first end portion, a second end portion, a leading cutting edge extending at least a major portion of the length thereof and a trailing edge opposite the leading edge, first means for mounting the cutter members and retaining them in diverging relationship from the cutter members front end portions toward their rear end portions with the cutting edges transversely more remote from one another along their lengths than the trailing edges, an elongated handle having a first end portion and a rear end portion for pulling the first means in a forward direction, second means for attaching the handle rear end portion to the first means, and a combination weed deflector runner having a front end mounted by one of the handle and second means to be forwardly of and at a higher elevation than the first means while weeds are being cut and a rear end portion at a lower elevation than the cutter member front end portions, the first means including a pair of runners, means for mounting said runners on the cutter members to extend forwardly and rearwardly between the cutter members with the runners in transversely spaced, parallel relationship and to extend to a lower elevation than the cutter members during a weed cutting operation, means connected to the cutter members front end portions for mounting the cutter members for pivotal movement about space parallel axes between a weed cutting position with the cutter members in the above mentioned diverging relationship and a storage position that the cutter members extend at least nearly parallel to one another with the cutting edges adjacent one another, and means for selectively retaining the runners in parallel relationship and the cutter members in the weed cutting position and alternately permitting the cutter members being pivoted to their storage position and the runners to extend at least nearly parallel to the cutter members.

25. For cutting weeds adjacent to the bottom of a body of water, an underwater weed cutter comprising a front mounting member for being pulled forwardly through the water, a first and a second elongated cutting member that each has a front end portion, a rear end portion, a leading cutting edge extending at least a major portion of the length thereof and a trailing edge, first means for mounting the cutter members front end portions on the mounting member, and brace means located rearwardly of the mounting member for retaining the cutter members in diverging relationship away from the mounting member with the cutting edges transversely more remote from one another along their lengths than the trailing edges, said brace means including first and second runners extending forwardly and rearwardly in parallel relationship between the cutter members for engaging the bottom of the body of water at a lower elevation than the cutter members during a weed cutting operation and having front end portions attached to the first and second cutter members respectively and rear end portions, a transversely elongated fin means for mounting the runners rear end portion in a preselected transverse spaced relationship and exerting a downward force on the runners rear end portions and the cutter members during a weed cutting operation, said fin means having a transversely elongated first leg that has first and second end portions and a second transversely elongated leg joined to the first leg to extend rearwardly thereof in an upward direction during a weed cutting operation, first fastener means for attaching the first leg first end portion to the first cutter member rearwardly of the first means and second fastner means for attaching the first leg second end portion to the second cutter member rearwardly of the first means, the second leg extending at least a major part of the distance between the first and second fastener means.

26. For cutting weeds adjacent to the bottom of a body of water, an underwater weed cutter comprising a front mounting member for being pulled in a forward direction through the water, a first and a second elongated cutter member that each has a front end portion, a rear end portion, a leading cutting edge extending at least a major portion of the length thereof and a trailing edge opposite the leading edge, first means mounting the cutter members front end portions on the mounting member for pivotal movement of the cutter members between a weed cutting position that the cutter members extend away from the mounting member in diverging relationship at a given angle substantially greater than about 10° with the cutting edges along their lengths transversely more remote from one another than the trailing edges and a storage position that the cutter members extend away from the mounting member at an angle less than about 10°, a first and a second runner each having a front end portion and a second end portion, second means for pivotally attaching the first runner front end portion to the first cutter member in spaced relationship to the first means, third means for pivotally attaching the second runner front end portion to the second cutter member in spaced relationship to the first means, a transverse back brace extending between the cutter members and having a first end portion, a second end portion, a first slot transversely intermediate the brace end portions for having the first runner second end portion extended theretrhough when the cutter members are in their weed cutting position, and a second slot for having the second runner second end portion extended therethrough when the cutter members are in their weed cutting positions, fourth means for removably attaching the brace first end portion to the first cutter member on the opposite side of the second means from the first means, fifth means for removably attaching the brace second end portion to the second cutter member on the opposite side of the third means from the first means, the slots being of sizes and shapes to maintain the runner second end portions in the desired transverse spaced relationship when the cutter members are in their weed cutting positons and the fourth and fifth means attach the brace to the cutter members and when the fourth and fifth means are moved to disconnect the brace from the cutter members the brace being movable away from the mounting member to a position rearwardly of the runner second end portions.

27. The apparatus of claim 26 further characterized in that the brace has a transversely elongated first leg that is substantially horizontal when the cutter members are in their weed cutting positions and extend horizontally and the brace is attached to the cutter members and a second leg joined to the first leg to extend upwardly and away from the first leg and the first means and is elongated to extend transversely a dimension that is greater than half of the spacing of the fourth and fifth means.

28. The apparatus of claim 27 further characterized in that the second end portion of each runner has an undersurface and a top surface and is rectangular in transverse cross section and that when the brace is attached to the cutter members by the fourth and fifth means the first leg has a top surface abuttable against the runner undersurface and has wall portions defining front transverse edges of the slots that are more closely adjacent to the first means than the second leg and that the second leg has wall portions defining transversely rear edges abuttable against the top surfaces of the runner rear edge portions.

29. For cutting weeds adjacent to the bottom of a body of water, an underwater weed cutter comprising first and second elongated cutter members that each has a front end portion, a rear end portion, a leading cutting edge extending at least a major portion of the length thereof and a trailing edge opposite the leading edge, a base plate for being pulled in a forward direction through the body of water, first means mounting the cutter blades front end portions on the base plate for pivotal movement to permit the cutter blades being pivoted between positions of differnt diverging relationships away from the base plate, second means for retaining the cutter members in a preselected diverging relationship while weeds are being cut and altenately permitting the cutter members being pivoted from the preselected diverging relationship, an elongated handle member having a first end portion for being pulled and a second end portion, third means for attaching the handle member second end portion to the base plate for pivotal movement about a first axes to permit the handle member being pivoted relative to the base plate between a position the handle member first end portion extends forwardly of the base plate and a position that the handle member first end portion extends rearwardly of the base plate, and a second pivot axis generally perpendicular to the first pivot axis to permit the handle member being pivoted from a position that the handle member first end portion extends forwardly of the base plate and a position that the handle member first end portion extends rearwardly of the base plate while the cutter members are retained in the preselected diverging relationship and a combination weed deflector runner having a front end mounted by the handle member for movement therewith to be forwardly of and at a higher elevation than the base plate when weeds are being cut and a rear end portion at a lower elevation than the base plate and cutter members front end portions.

30. The apparatus of claim 29 further characterized in that the second means includes a second and a third runner that each has a front end portion, a rear end portion and an intermediate portion to extend to a lower elevation than the cutter members during a weed cutting operation, fourth means for attaching the second runner front end portion to the first cutter member for pivotal movement, fifth means for attaching the third runner front end portion to the second cutter member for pivotal movement, the fourth and fifth means mount the second and third runners for movement between first positions that the second and third runners extend parallel to one another in transverse spaced relationship when the cutter members are in said preselected relationship and second positions that the runners extend more nearly parallel to the respective cutter member to which they are pivotally attached than they are in their first positions, and that the second means comprises sixth means for selectively retaining the second and third runners rear portions transversely spaced from one another that they are maintained in substantially parallel relationship while retaining the cutter members in said preselected relationship.

31. The apparatus of claim 30 further characterized in that the first means comprises means for mounting the cutter members on the base plate for pivotal movement about spaced parallel axes between said preselected diverging relationship and a storage position that the cutter members extend nearly parallel to one another with the cutting edges adjacent one another and that the base plate has means for limiting the pivotal movement of the cutter members in directions from their storage position to the preselected diverging relationship.

* * * * *

UNITED STATES PATENT AND TRADEMARK OFFICE
CERTIFICATE OF CORRECTION

PATENT NO. : 4,583,353

DATED : April 22, 1986

INVENTOR(S) : Richard L. Shaver

It is certified that error appears in the above-identified patent and that said Letters Patent is hereby corrected as shown below:

Column 15, line 19, "ember" should be printed --member--, and
Column 16, line 26, "9020" should be printed --90°--.

Signed and Sealed this

Twenty-ninth Day of July 1986

[SEAL]

Attest:

DONALD J. QUIGG

Attesting Officer

Commissioner of Patents and Trademarks